US008833166B2

(12) United States Patent
Yamashita et al.

(10) Patent No.: US 8,833,166 B2
(45) Date of Patent: Sep. 16, 2014

(54) ROTATION DETECTING APPARATUS (75) Inventors: Takahiro Yamashita, Yokkaichi (JP);
Moriyuki Shimizu, Yokkaichi (JP);
Kyungwoo Kim, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 271 days.

(21) Appl. No.: 13/393,689

(22) PCT Filed: Feb. 23, 2010

(86) PCT No.: PCT/JP2010/001212
§ 371 (c)(1),
(2), (4) Date: Mar. 1, 2012

(87) PCT Pub. No.: WO2011/027482
PCT Pub. Date: Mar. 10, 2011

(65) Prior Publication Data
US 2012/0160026 A1     Jun. 28, 2012

(30) Foreign Application Priority Data
Sep. 1, 2009   (JP) ................. 2009-201546

(51) Int. Cl.
G01P 3/487       (2006.01)
G01P 3/00        (2006.01)
G01P 3/42        (2006.01)
G01P 1/02        (2006.01)
F16C 41/00       (2006.01)
F16C 33/72       (2006.01)
G01D 5/06        (2006.01)
G01P 3/44        (2006.01)
F16C 19/18       (2006.01)

(52) U.S. Cl.
CPC ............... *G01P 3/443* (2013.01); *F16C 19/186* (2013.01); *G01P 1/026* (2013.01); *F16C 2326/02* (2013.01); *F16C 41/007* (2013.01); *G01P 3/487* (2013.01); *F16C 33/723* (2013.01); *G01D 5/06* (2013.01)
USPC ........................................ 73/514.39; 324/174

(58) Field of Classification Search
CPC ......... G01P 3/487; G01P 3/488; G01P 3/443; G01P 3/481; G01P 1/026; G01P 1/06; G01P 1/04
USPC .......... 73/514.39, 488, 494; 324/174, 207.15, 324/207.22, 207.2, 207.25
See application file for complete search history.

(56) References Cited

U.S. PATENT DOCUMENTS 5,583,431 A * 12/1996 Ouchi et al. ................... 324/174
5,877,625 A *  3/1999 Togo et al. .................... 324/174

(Continued)

FOREIGN PATENT DOCUMENTS

JP    A-2007-010480     1/2007
JP    A-2007-333169    12/2007

(Continued)

OTHER PUBLICATIONS

May 11, 2012 International Search Report issued in International Application No. PCT/JP2010/001212.

*Primary Examiner* — Helen Kwok
(74) *Attorney, Agent, or Firm* — Oliff PLC (57) ABSTRACT A rotation detecting apparatus includes core member having a receiving hole, an inner member that is rotatably supported by the core member, and an outer member that constitutes a wheel bearing device. The rotation detecting apparatus also includes a rotation detecting sensor, an external lead cable that is drawn out from an inner space through the receiving hole in the core member and a sealing member that is secured to an outer peripheral surface of the external lead cable.

5 Claims, 7 Drawing Sheets

(56) References Cited

U.S. PATENT DOCUMENTS

| | | | |
|---|---|---|---|
| 5,880,585 A * | 3/1999 | Oguro | 324/174 |
| 6,053,046 A * | 4/2000 | Masaki et al. | 73/514.39 |
| 6,205,858 B1 * | 3/2001 | Palfenier et al. | 73/514.39 |
| 6,564,635 B2 * | 5/2003 | Sherman et al. | 73/494 |
| 7,141,966 B2 * | 11/2006 | Sumiya et al. | 324/207.25 |
| 7,401,800 B2 * | 7/2008 | Jordan | 280/276 |
| 7,741,838 B2 * | 6/2010 | Takahashi et al. | 324/160 |
| 8,253,412 B2 * | 8/2012 | Iwahashi et al. | 324/207.25 |
| 2002/0014888 A1 * | 2/2002 | Harada | 324/174 |
| 2006/0002644 A1 * | 1/2006 | Mitsue et al. | 384/448 |
| 2006/0254354 A1 * | 11/2006 | Maes | 73/514.39 |
| 2009/0277268 A1 * | 11/2009 | Ishii | 73/514.39 |

FOREIGN PATENT DOCUMENTS

| JP | B2-4179083 | 9/2008 |
|---|---|---|
| JP | A-2008-241627 | 10/2008 |

* cited by examiner

ROTATION DETECTING APPARATUS

This is a national phase application of PCT/JP2010/001212 filed on Feb. 23, 2010. This application claims priority to Japanese Application Number JP-2009-201546, which was filed in the Japanese Patent Office on Sep. 1, 2009. The entire contents of which are incorporated by reference herein.

The disclosed embodiments relate to a rotation detecting apparatus to be mounted on a bearing section of a wheel of a motor vehicle or the like.

BACKGROUND

Heretofore, a rotation detecting apparatus has been mounted on a bearing section of a wheel of a motor vehicle. The rotation detecting apparatus detects a wheel rotation speed to be utilized to control an antilock braking system (ABS).

A rotation detecting apparatus in the related art has widely adopted a connector-style connection for carrying out a method for fixing an external lead cable onto a lead wire extending from a detecting section of a rotation-detecting sensor. For example, as shown in. FIG. 2 of Patent Document 1 (JP 4179083B), a rotation detecting sensor includes a detecting section, and a holding section made of hard synthetic resin and holding the detecting section. A connector coupling section is integrated with the holding section. When a connector attached to an end of an external lead cable is attached to the connector coupling section, a lead wire projecting into the connector coupling section is connected to the external lead cable.

However, if such connection is adopted, since there is a clearance between the connector coupling section and the connector attached thereto, it is not possible to prevent water from entering the connector coupling section through the clearance.

Further, since the conventional rotation detecting apparatus has adopted the connector-style connection, the connector coupling section has required a large size. Consequently, it is not possible to avoid upsizing the rotation detecting apparatus. Thus, the related art rotation detecting apparatus exhibits problems with regard to both excessive moisture and larger size.

SUMMARY

In view of the above problems, an object of the present invention is to provide a rotation detecting apparatus having a new construction that can attain compatibility between enhancement in waterproofing function of a rotation detecting sensor and miniaturization of the apparatus.

A first aspect of the present invention is directed to a rotation detecting apparatus wherein a core member rotatably supports an inner member to be attached to a wheel and is fixed on an outer member that constitutes a wheel bearing device, a rotation detecting sensor is attached to the core member, a detecting section of the rotation detecting sensor is opposed to a magnetic rotor provided on the inner member, and the detecting section detects a variation of a magnetic field caused by rotation of the magnetic rotor. The rotation detecting apparatus is characterize in that the rotation detecting sensor is contained in an inner space covered by the core member and is supported by the core member; a lead wire extending from the detecting section of the rotation detecting sensor is electrically connected to an external lead cable; the external lead cable is drawn out from the inner space through a receiving hole in the core member; a sealing member is secured to an outer peripheral surface of the external lead cable; and the sealing member is fitted in the receiving hole in the core member.

According to the first aspect of the present invention, since the sealing member provided on the outer periphery of the external lead cable can close the receiving hole in the core member when the external lead cable is drawn out from the inner space defined by the core member and the outer member, it is possible to overcome the problem with clearance seen in the connector-style connection. Accordingly, it is possible to obtain the waterproofing function in the drawn portion of the external lead cable with high reliability.

By utilizing the inner space defined by the core member and the outer member, the external lead cable and the connecting portion between the lead wire and the external lead cable can be contained in the inner space and only the external lead cable can be drawn out from the core member and can be arranged. Accordingly, it is possible to downsize the apparatus compared with the conventional construction, in which a connector coupling portion having a large size had to be protruded from the core member.

A second aspect of the present invention is directed to the rotation detecting apparatus according to the first aspect, wherein a sealing rubber is disposed on a coupling portion between the receiving hole in the core member and the sealing member to seal the coupling portion.

According to the second aspect of the present invention, since the sealing rubber such as an O-ring seals the coupling portion between the receiving hole in the core member and the sealing member, even if the rotation detecting apparatus is exposed to a fierce variation in temperature, the coupling portion can flexibly follow a strain caused on account of differences in thermal expansion coefficient between the receiving hole in the core member and the sealing member and it is therefore possible to further enhance the waterproofing function.

A third aspect of the present invention is directed to the rotation detecting apparatus according to the first aspect, wherein a latch projection that is larger than the receiving hole in the core member is integrated with the sealing member, and the latch projection is engaged with the core member from a side of the inner space.

According to the third aspect of the present invention, even if an external force is applied to the external lead cable so as to draw it out, since the latch projection is caught on the periphery around the receiving hole, it is possible to prevent the external lead cable from being drawn out from the core member. It is also possible to prevent a drawing force from being applied to the rotation detecting sensor and the coupling portion between the lead wire and the external lead cable.

A fourth aspect of the present invention is directed to the rotation detecting apparatus according to the first aspect, wherein the core member is formed into a cup-like configuration, an opening space of the core member is secured to the outer member and is covered by the outer member so that the inner space is defined in the interior of the core member, an inner casing assembly is fixed on the core member, and the detecting section and the external lead cable are attached to the interior of the inner casing assembly.

According to the fourth aspect of the present invention, since the inner casing assembly is further provided in the inner space in the core member, a double casing structure is constructed and the detecting section and the external lead cable are disposed in the interior of the inner casing assembly, thereby protecting them more efficiently.

A fifth aspect of the present invention is directed to the rotation detecting apparatus according to the fourth aspect, wherein a pressing hardware is fitted in the core member from the outside of the inner casing assembly so that the pressing hardware is pressed into the core member, and the inner casing assembly is secured to the core member by the pressing hardware.

According to the fifth aspect of the present invention, since the pressing hardware is secured to the core member, it is possible to easily prevent the rotation detecting sensor from being drawn out toward the wheel side.

According to the present invention, it is possible to attain compatibility between enhancement in waterproofing function of a rotation detecting sensor and miniaturization of the apparatus.

DETAILED DESCRIPTION OF EMBODIMENTS

Referring now to the drawings, an embodiment of a rotation detecting apparatus in accordance with the present invention will be described below.

Figure 1:
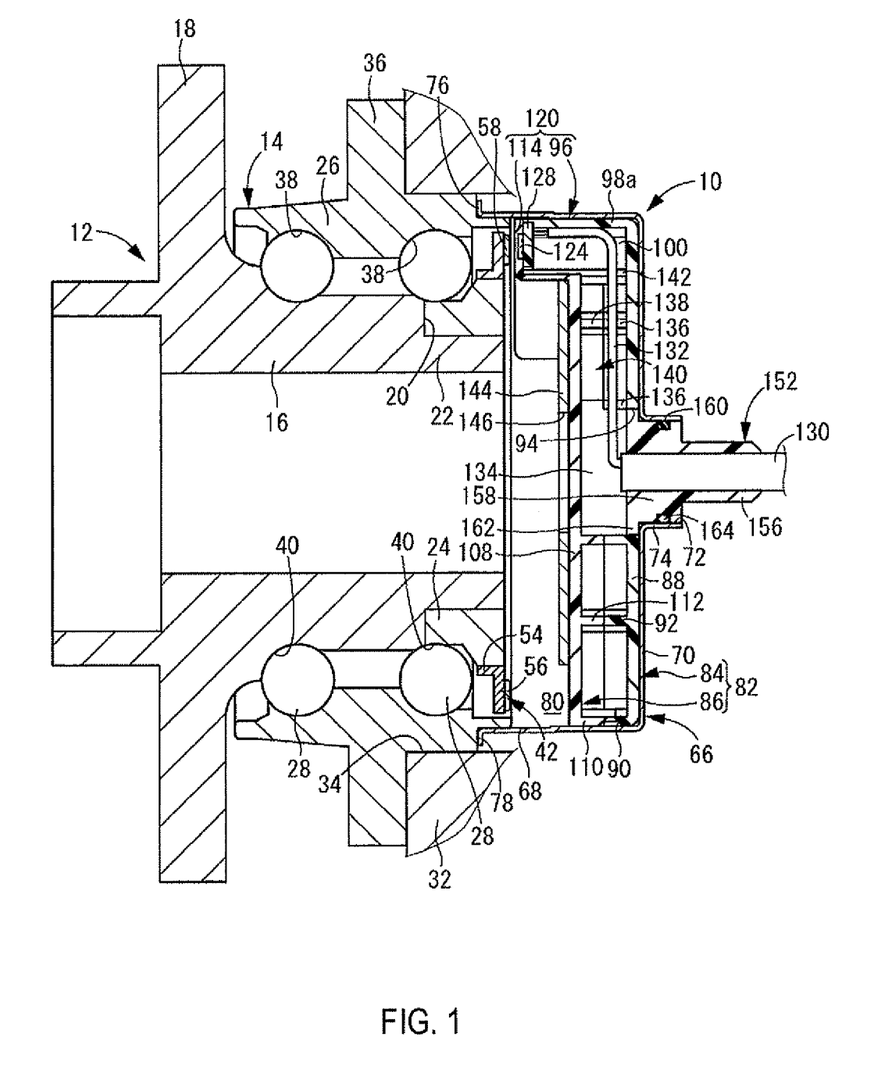
FIG. 1 is a longitudinal section view of an embodiment of a rotation detecting apparatus in accordance with the present invention, illustrating the rotation detecting apparatus attached to an axial end of a wheel bearing device.
Figure 2:
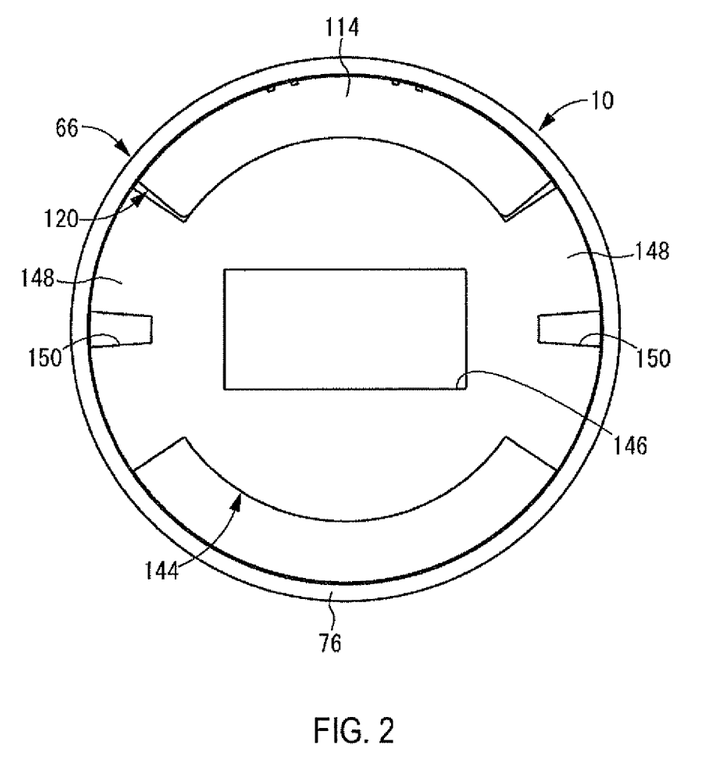
FIG. 2 is an end side view of the rotation detecting apparatus shown in FIG. 1.
Figure 3:
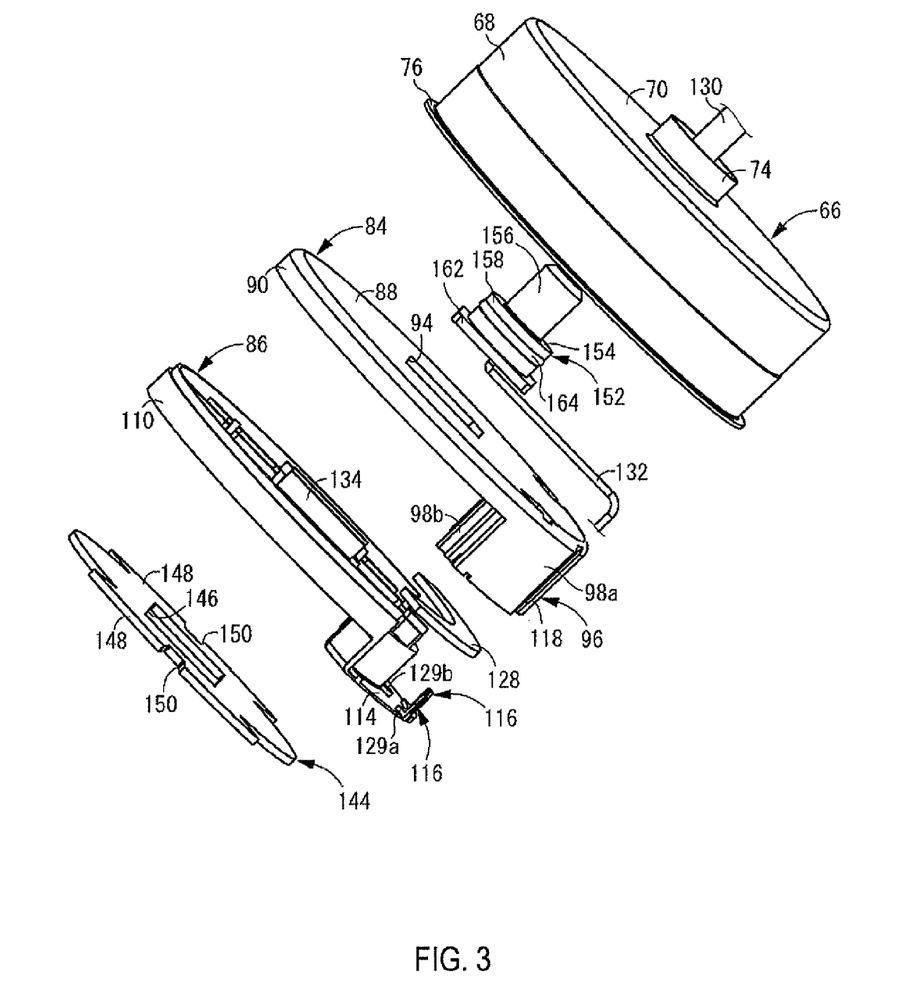
FIG. 3 is an exploded perspective view of the rotation detecting apparatus shown in FIG. 1.

FIGS. 1 to 3 show a wheel speed sensor 10 that is an embodiment of the rotation detecting apparatus in accordance with the present invention. The wheel speed sensor 10 is mounted on an axial end of a wheel bearing device 14 attached to a hub shaft 12. Hereinafter, the one of axial end sides (a right end side in FIG. 1) of the wheel bearing device 14 is defined as a vehicle inside while the other of axial end sides (a left side in FIG. 1) of the wheel bearing device 14 is defined as a vehicle outside.

More specifically, the hub shaft 12 is provided on its axial middle part of an axis section 16 with a flange portion 18 that extends outward in a radial direction (a direction perpendicular to an axis). A wheel (not shown) is secured to a vehicle outside end of the axis section 16 on the flange portion 18. The axis section 16 is provided at the vehicle inside over the flange portion 18 with an annular stepped surface 20 that extends in the radial direction (in the direction perpendicular to the axis). The axis section 16 is provided at the vehicle inside over the annular stepped surface 20 with a smaller diameter portion 22 that is smaller than a diameter of the vehicle outside.

The wheel bearing device 14 attached to the hub shaft 12 includes an inner member 24, an outer member 26, and rolling elements 28 arranged on a plurality of rows.

The inner member 24 is formed into an annular block-like configuration that has a large thickness and a small diameter. The inner member 24 is fitted on and secured to a smaller diameter portion 22 of the hub shaft 12.

The outer member 26 is formed into a cylindrical configuration that has a large thickness and a large diameter. The outer member 26 is mounted on the axis section 16 of the hub shaft 12 to which the inner member 24 is secured. The outer member 26 is disposed outside the axis section 16 and the inner member 24 in the radial direction (in the direction perpendicular to the axis). The outer member 26 is inserted into a receiving hole 34 in a support member 32 made of an element such as a knuckle on a vehicle body side. The outer member 26 is fixed on the support member 32 by bolts at an attaching flange 36 that extends outward in the radial direction. Thus, the outer member 26 is secured to the support member 32 at the vehicle body side so that the outer member 26 cannot rotate.

The rolling elements 28 on the plural rows are rotatably disposed between outer ring tracks 38, 38 formed in an inner peripheral surface of the outer member 26 and inner ring tracks 40, 40 formed in outer peripheral surfaces on the axis section 16 of the hub shaft 12 and on the inner member 24. Thus, the inner member (wheel) 24 is rotatably supported on the outer member 26 (the support member 32 at the vehicle body side 32). The inner ring track 40 disposed at the vehicle inside is defined across the axis section 16 of the hub shaft 12 and the inner member 24.

An opening space toward the vehicle inside is defined in a clearance between surfaces of the outer member 26 and the inner member 24 opposed to each other in the radial direction. A support hardware 42 is disposed in the opening space so that the support hardware 42 is fitted on the inner member 24 at a vehicle inner side end.

Figure 4:
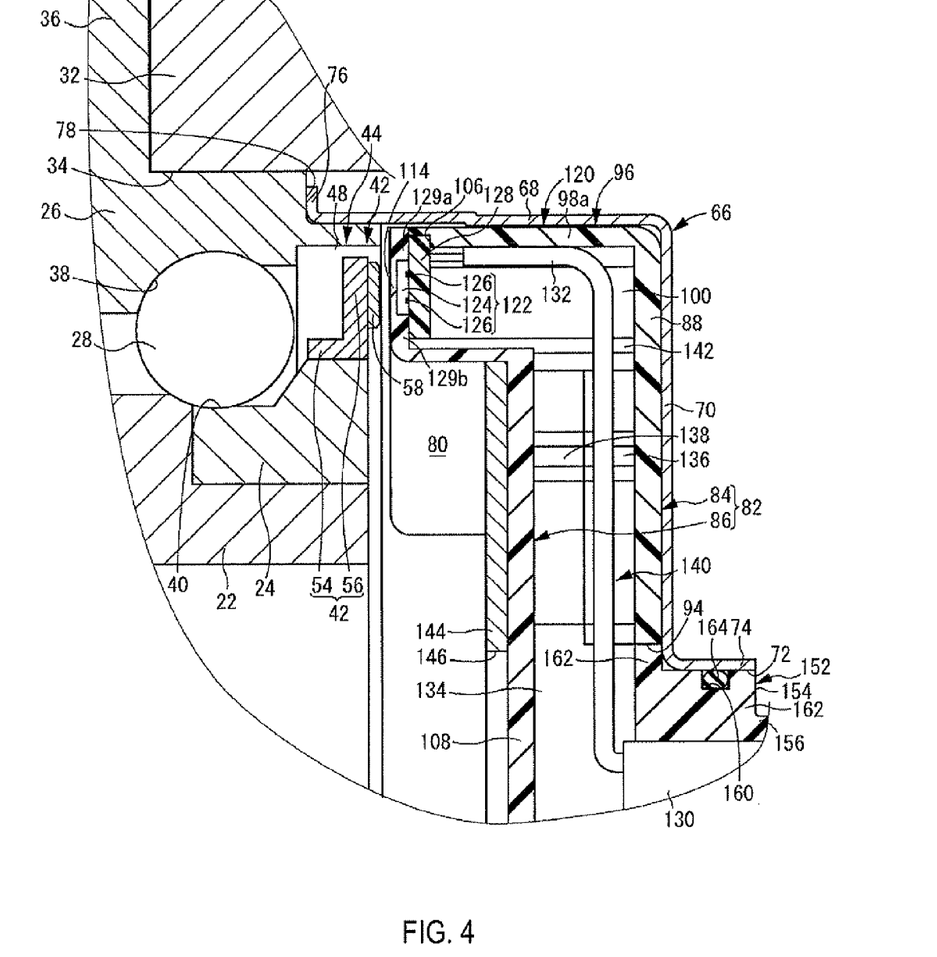
FIG. 4 is an enlarged view of a main part of the rotation detecting apparatus shown in FIG. 1.

The support hardware 42, as shown also in FIG. 4, is provided with an outer flange 56 that extends outward from the vehicle inner side end of a cylindrical portion 54 in the radial direction through a periphery of the portion 54. A magnetic rotor 58 is secured to the outer flange 56 at the vehicle inside. The magnetic rotor 58 is made of a rubber magnet, a plastic magnet, or the like in which N poles and S poles are formed alternately in a peripheral direction of the rotor 58. The magnetic rotor 58 is formed into an annular plate-like configuration.

A wheel speed sensor 10 is attached to the vehicle inside end of the wheel bearing device 14 and includes a core member 66. The core member 66 includes a cylindrical wall 68 and a bottom wall 70 that covers an opening space defined in an axial end of the cylindrical wall 68. The core member 66 is formed into a cup-like configuration.

The core member 66 is provided in a center part of the bottom wall 70 with a receiving hole 72 that is open in a circular shape in cross section. The core member 66 is provided on a peripheral edge around the receiving hole 72 with a cylindrical portion 74 that extends outward in the axial direction. Thus, the receiving hole 72 extends straight in the axial direction in the cylindrical portion 74 so that the receiving hole 72 maintains a substantially circular shape in cross section.

The opening space in the core member 66 is fixed on the vehicle inside end of the outer member 26. At this time, a contact flange 76 that extends outward from an opening space edge around the core member 66 in the radial direction (in the direction perpendicular to the axis) is superimposed on an annular contact surface 78 that extends in the radial direction on an outer peripheral surface of the vehicle inside end of the outer member 26. Thus, an amount of coupling (coupling depth) between the core member 66 and the outer member 26 is defined, thereby forming a given clearance between the magnetic rotor 58 and a holding projection 120 mentioned below.

As described above, since the opening space in the core member 66 is fitted on and secured to the vehicle inside end of the outer member 26, the opening space in the core member 66 is covered with the vehicle bearing device 14. Thus, an inner space 80 is defined in the interior of the core member 66.

An inner casing assembly 82 is disposed in the inner space 80. The inner casing assembly 82 includes a bottom casing member 84 and a lid member 86.

Figure 5:
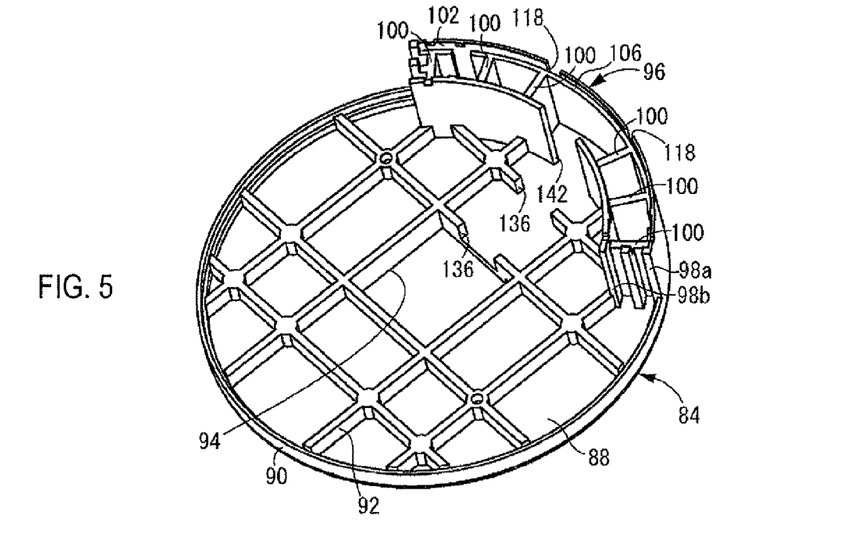
FIG. 5 is a perspective view of a bottom member that constitutes the rotation detecting apparatus shown in FIG. 1.
Figure 6:
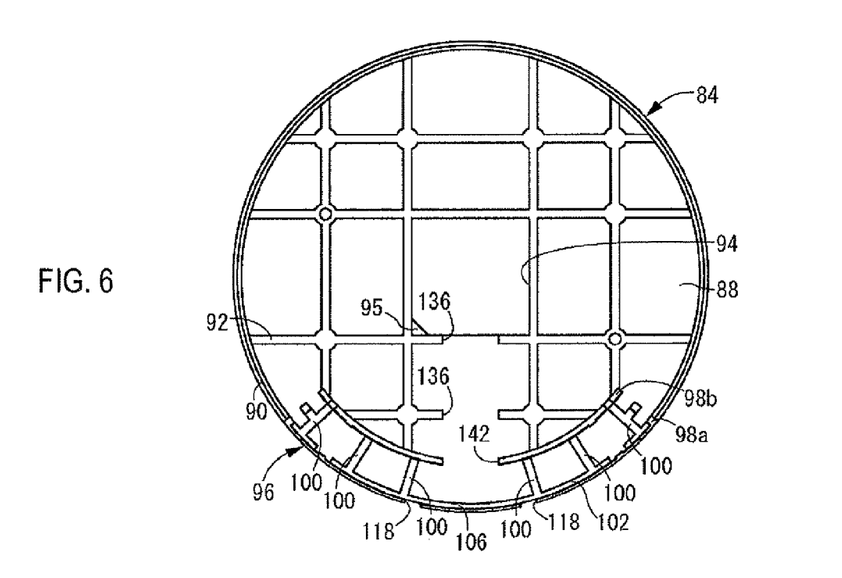
FIG. 6 is a plan view of the bottom member shown in FIG. 5.
Figure 7:
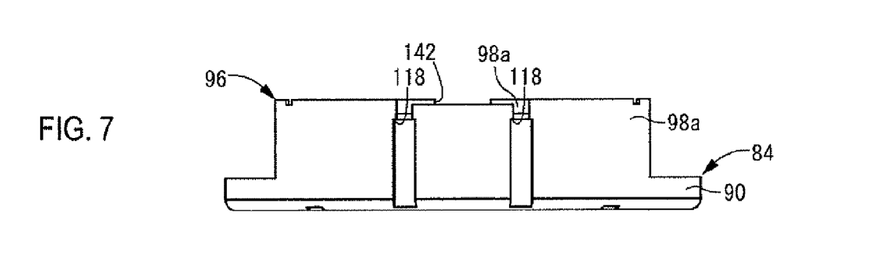
FIG. 7 is a side elevation view of the bottom member shown in FIG. 5.

As shown in FIGS. 5 to 7, the bottom member 84 is formed into a shallow dish-like configuration in which a peripheral wall 90 projects from an outer peripheral edge of a disk-like bottom wall 88 through its entire periphery. Reinforcement ribs 92 project from the bottom wall 88 in a grid manner.

The bottom wall 88 is provided in its central part with a central hole 94. The central hole 94 has an opening in cross section larger than the receiving hole 72 in the core member 66. As shown in FIG. 6, the central hole 94 is provided in one of its square sides (a left lower side in a plan view in FIG. 6) with a cut-out remainder 95.

The bottom wall 88 is provided on its outer periphery with a curved projection 96 that extends by a suitable length in a peripheral direction and projects in the same direction as the peripheral wall 90. The curved projection 96 includes a pair of curved walls 98*a* and 98*b* that are spaced apart from each other by a suitable distance in the radial direction are opposed to each other in the radial direction. The curved walls 98*a* and 98*b* are coupled to each other by a plurality of connecting walls 100 that are spaced apart from one another by a suitable distance in the peripheral direction. A projecting height of the curved projection 96 is larger than projecting heights of the peripheral wall 90 and reinforcement ribs 92. The curved walls 98*a* and 98*b* are integrated with the peripheral wall 90.

The outer curved wall 98*a* is provided on its projecting end with a stepped surface 102 that is curved at a radial intermediate part in a peripheral direction and extends in a height direction. A height of a radial inside is set to be smaller than that of a radial outside with respect to the stepped surface 102. Thus, the outer curved wall 98*a* is provided on its projecting end with a support surface 106 that is disposed on the same height as projecting end surfaces of the coupling walls 100 at the inside in the radial direction from the stepped surface 102.

Figure 8:
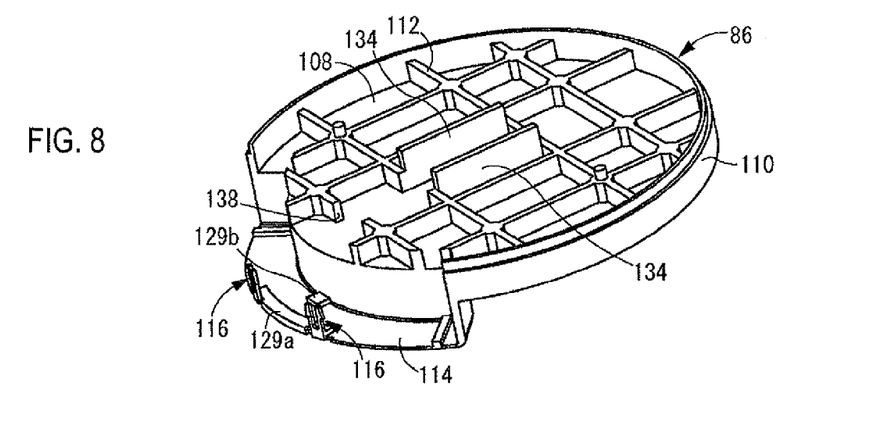
FIG. 8 is a perspective view of a lid member that constitutes the rotation detecting apparatus shown in FIG. 1.
Figure 9:
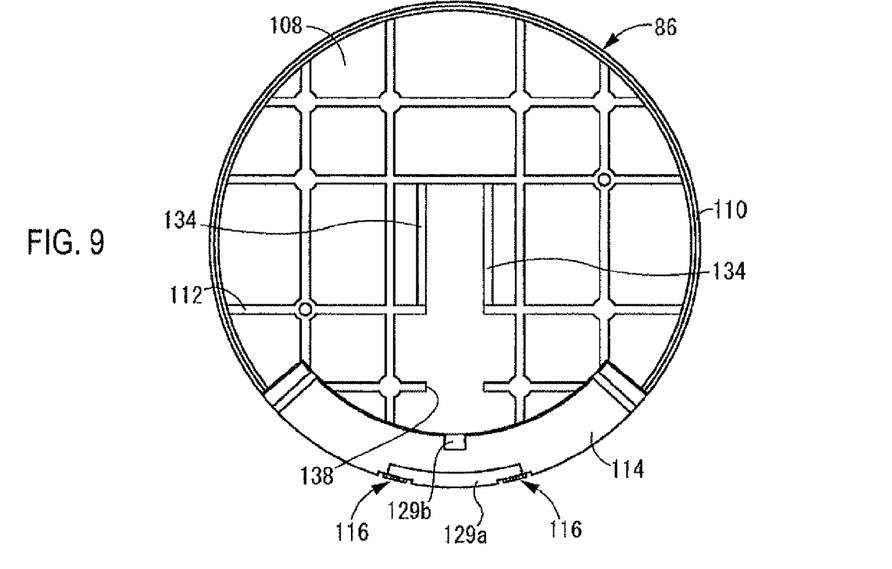
FIG. 9 is a plan view of the lid member shown in FIG. 8.
Figure 10:
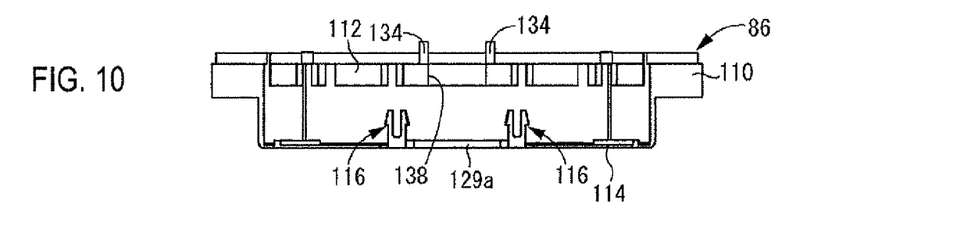
FIG. 10 is a side elevation view of the lid member shown in FIG. 8.

On the other hand, as shown in FIGS. 8 to 10, the lid member 86 is formed into a shallow dish-like configuration in which a peripheral wall 110 projects from an outer peripheral edge of a disk-like bottom wall 108 through its entire periphery. Reinforcement ribs 112 project from the bottom wall 108 in a grid manner.

The bottom wall 108 is provided on its outer peripheral part with a deep bottom portion 114 that is a flat surface-like configuration corresponding to the curved projection 96. The peripheral wall 110 is not provided on the peripheral part of the deep bottom portion 114.

When the deep bottom portion 114 and the curved projection 96 are opposed to each other, the lid member 86 and the bottom member 84 can be superimposed on and coupled to each other in the axial direction. Thus, the inner hollow casing assembly 82 can be formed (see FIG. 1).

When the lid member 86 and the bottom member 84 are coupled to each other, an elastic latch piece 116 provided on an outer peripheral edge around the deep bottom portion 114 is engaged with an engagement recess 118 provided on an outer peripheral surface of the outer curved wall 98*a* in the axial direction. Thus, the lid member 86 and the bottom member 84 are maintained in an assembled state.

The inner casing assembly 82 is provided on its outer peripheral part with a holding projection 120 so that the deep bottom portion 114 is superimposed on the projecting portion of the curved projection 96. A rotation detecting sensor 122 is attached to the interior in a projecting end portion of the holding projection 120. The rotation detecting sensor 122 includes a detecting section 124 and lead wires 126, 126.

The detecting section 124 is made of an IC (Integrated Circuit). The detecting section 124 outputs a voltage in response to a change of a magnetic flux density caused by rotation of the magnetic rotor 58. The detecting section 124 is disposed on a board 128 that has a flat surface-like configuration smaller than the deep bottom portion 114. The board 128 is contained in a clearance defined among the projecting end surfaces of the coupling walls 100, the support surface 106 on the outer curved wall 98*a*, and the deep bottom portion 114. Thus, the rotation detecting sensor 122 is attached to the interior in the projecting end portion of the holding projection 120. The detecting section 124 is disposed between two protrusions 129*a* and 129*b* that project from the deep bottom portion 114. The lead wires 126, 126 extend from the detecting section 124. The lead wires 126, 126 are soldered to input and output electrical wires 132, 132 of an external lead cable 130 through a conductive pattern (not shown) formed on the board 122. Thus, the lead wires 126, 126 and the external lead cable 130 are electrically connected to each other.

The input and output electrical wires 132, 132 of the external lead cable 130 are made of copper wires covered with sheath materials made of synthetic resin such as polyethylene. The wires 132, 132 are bundled with each other and are contained in synthetic resin cover members. The external lead cable 130 is led out from the central hole 94 in the bottom member 84.

The input and output electrical wires 132, 132 pass a guide passage 140 that is defined by a pair of guide walls 134, 134 that project from a central part on the bottom wall 108 of the lid member 86 and extend in parallel with respect to each other, and cut-out portions 136, 138 formed in the reinforcement ribs 92 of the bottom member 84 and in the reinforcement ribs 112 of the lid member 86. The input and output electrical wires 132, 132 extend from the central part of the inner casing assembly 82 to an outer periphery provided with the holding projection 120. The input and output electrical wires 132, 132 enter the holding projection 120 through a cut-out portion 142 formed in the inner curved wall 98*b* and are soldered to the conductive pattern formed on the board 128.

As described above, the rotation detecting sensor 122 and the external lead cable 130 are attached to the interior in the inner casing assembly 82 and the inner casing assembly 82 is contained in the inner space 80 when the bottom wall 108 of the bottom member 84 is superimposed onto the bottom wall 70 of the core member 66. At this time, the holding projection 120 extends along the cylindrical wall 68 of the core member 66 in the peripheral direction and projects toward the opening end side of the core member 66.

A pressing hardware 144 is disposed in the inner space 80, in which the inner casing assembly 82 is contained, at the opening side of the core member 66 beyond the inner casing assembly 82. The pressing hardware 144 is formed into a thin disk-like configuration and is provided in a central part with a rectangular aperture 146 in cross section.

The pressing hardware 144 is provided with a pair of fixing pieces 148, 148 (see FIGS. 3 and 4) extending outward in the radial direction so that the fixing pieces 148, 148 are opposed to each other across the center of the pressing hardware 144. Each fixing piece 148 is provided in its central part in the peripheral direction with a cut-out portion 150. Thus, as described below, the fixing piece 148 can be readily deformed in its thickness direction and the pressing hardware 144 can be easily fitted into the cylindrical wall 68 of the core member 66.

A distance between the pair of fixing pieces 148, 148 at the one side in the peripheral direction is the same as a distance between the fixing pieces 148, 148 at the other side in the peripheral direction. Thus, as described below, it is easy to position the pressing hardware 144 in the peripheral direction when the pressing hardware 144 is fitted into the cylindrical wall 68 of the core member 66.

When the inner casing assembly 82 is contained in the core member 66 and the holding projection 120 is disposed between the pair of fixing pieces 148, 148 in the peripheral direction, the pressing hardware 144 is fitted into the cylindrical wall 68 of the core member 66. At this time, each of the pair of fixing pieces 148, 148 contacts with the cylindrical wall 68 of the core member 66 and the pressing hardware 144 is pressed into and fixed in the core member 66 at the pair of fixing pieces 148, 148. Consequently, the inner casing assembly 82 is pressed between the pressing hardware 144 and the bottom wall 70 of the core member 66 and is secured to the core member 66, when the holding projection 120 protrudes toward the opening side of the core member 66 beyond the pressing hardware 144.

The holding projection 120, which protrudes toward the opening side of the core member 66 beyond the pressing hardware 144, is faced to the magnetic rotor 58 through a given distance. Thus, the detecting section 124 attached to the projecting end of the holding projection 120 is opposed to the magnetic rotor 58 across the deep bottom portion 114.

When the inner casing assembly 82 is fixed on the core member 66, the external lead cable 130 extends outward from the receiving hole 72 in the core member 66. A sealing member 152 is secured to an outer peripheral surface of the external lead cable 130. The sealing member 152 is fitted in the receiving hole 72 in the core member 66.

Figure 11:
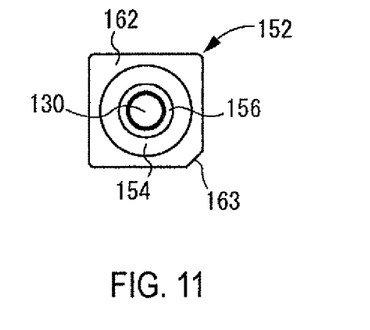
FIG. 11 is a plan view of a sealing member that constitutes the rotation detecting apparatus shown in FIG. 1.
Figure 12:
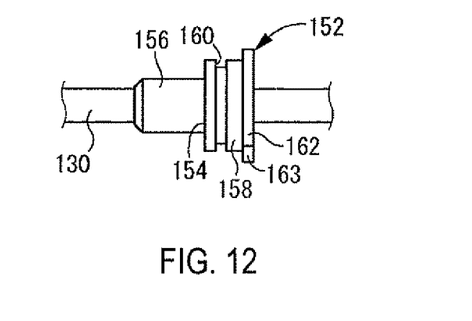
FIG. 12 is a side elevation view of the sealing member shown in FIG. 11.

The sealing member 152 is made of a polyamide, such as PA612. The sealing member 152 is closely adhered to the outer peripheral surface of the external lead cable 130 in good condition. As shown in FIGS. 11 and 12, the sealing member 152 is formed into a thick disk-like configuration.

The sealing member 152 is provided on its intermediate part in the axial direction with a stepped surface 154 that extends in the radial direction (in the direction perpendicular to the axis). The one axial side of the sealing member 152 across the stepped surface 154 defines a smaller diameter portion 156 while the other axial side of the sealing member 152 across the stepped surface 154 defines a larger diameter portion 158. An outer diameter of the larger diameter portion 158 is substantially the same as an inner diameter of the receiving hole 72 in the core member 66.

The larger diameter portion 158 is provided on its intermediate part in the axial direction with a groove 160 that is open in an outer peripheral surface of the portion 158, has a substantially constant shape in cross section, and extends through the entire periphery of the larger diameter portion 158.

A latch projection 162 is integrated with the other axial end of the larger diameter portion 158. The latch projection 162 is formed into a rectangular block-like configuration. A positioning surface 163 (see FIG. 11) is formed on the outer peripheral surface of the latch projection 162 by cutting out a corner of a square portion in a plan view. Thus, the latch projection 162 has a size and a cross sectional shape corresponding to the central hole 94 in the bottom member 84 and extends in the axial direction. Thus, as described below, when the latch projection 162 is fitted into the central hole 94 in the bottom wall 84, it is possible to position the sealing member 152 in the peripheral direction by positioning the cut-out remainder 95 on the positioning surface 163.

The sealing member 152 is secured to a part of the external lead cable 130 that extends outward from the inner casing assembly 82. The sealing member 152 can be molded on the external lead cable 130 or can be secured to the external wire 130 by an adhesive after forming the sealing member 152 in another process.

The sealing member 152, secured to the external lead cable 130, is fitted into the receiving hole 72 in the core member 66, when the larger diameter portion 158 of the sealing member 152 is inserted into the cylindrical portion 74 of the core member 66 from the inside of the core member 66. At this time, a sealing rubber 164 made of an O-ring or the like is disposed in the groove 160 in the sealing member 152. Thus, a clearance between the cylindrical portion 74 of the core member 66 and the larger diameter portion 158 of the sealing member 152 is sealed by the O-ring.

An outer peripheral edge around the latch projection 162 of the sealing member 152 is superimposed on the opening peripheral edge around the receiving hole 72 in the bottom wall 70 of the care element 66. Thus, the latch projection 162 of the sealing member 152 is engaged with the bottom wall 70 of the core member 66 from the inside of the core member 66.

When the sealing member 152 is fitted in the receiving hole 72 in the core member 66, the latch projection 162 of the sealing member 152 is fitted in the central hole 94. Thus, the external lead cable 130 is prevented from rotating about the central axis of the cable 130.

In the wheel speed sensor 10 described above, the larger diameter portion 158 of the sealing member 152 attached closely to the external lead cable 130 is fitted in the cylindrical portion 74 of the core member 66 and the external lead cable 130 is led outward from the core member 66 through the larger diameter portion 152. Thus, it is possible to sufficiently attain a waterproofing function for a portion of the external lead cable 130 drawn out from the core member 66.

In particular, the sealing rubber 164 disposed in the groove 160 in the larger diameter portion 158 seals the clearance between the lager diameter portion 158 and the cylindrical portion 74. Thus, even if a use environment is subject to a heavy change in temperature, it is possible to exert a positive waterproofing effect in response to an instantaneous change of a clearance between the receiving hole 72 in the core member 66 and the sealing member 152, thereby further enhancing the waterproofing function for the portion of the external lead cable 130 drawn out from the core member 66.

In addition, the rotation detecting sensor 122 and the external lead cable 130 are contained in the inner casing assembly 82. Thus, it is possible to further enhance the waterproofing function for the rotation detecting sensor 122.

Since a connecting portion between the lead wires 126, 126 and the external lead cable 130, and the external lead cable 130 are contained in the inner casing cable 130 outward from the core member 66. Consequently, it is not necessary to protrude a large size connector joining portion from the core member, and it is possible to downsize the entire wheel speed sensor 10.

The latch projection 162 is engaged with the opening peripheral edge around the receiving hole 72 from the inside of the core member 66. Thus, even if an external force is applied to the external lead cable 130 to draw the cable 130 from the core member 66, it is possible to prevent the external lead cable 130 from being drawn out. In result, it is possible to prevent an external force from being applied through the external lead cable 130 to the connecting portion between the lead wires 126, 126 and the external lead cable 130, or to the rotation detecting sensor 122.

Also, the inner casing assembly 82 is clamped by the pressing hardware 144, which is pressed into and secured to the cylindrical portion 68 of the core member 66, and by the bottom wall 70 of the core member 66. Thus, it is possible to maintain the clearance between the holding projection 120 and the magnetic rotor 58 in the original size. Consequently, it is possible for the detecting section 124 of the rotation detecting sensor 122 to attain a high precision in detection.

Although the embodiment of the present invention is described above, it should be noted that the present invention is not limited to the specific descriptions. For example, the rotation detecting sensor may be a construction in which a publicly known hole IC is molded in resin and the rotation detecting sensor is directly secured to the core member to eliminate the inner casing assembly.

What is claimed is:

1. A rotation detecting apparatus comprising:
    a core member having a receiving hole;
    an inner member that: i) is rotatably supported by the core member, ii) is configured to be attached to a wheel, and iii) includes a magnetic rotor;
    an outer member that constitutes a wheel bearing device, the outer member having the inner member fixed thereupon;
    a rotation detecting sensor that: i) is attached to the core member, ii) is contained in an inner space covered by the core member, iii) is supported by the core member, and iv) has a detecting section,
    the detecting section: i) being opposed to the magnetic rotor, ii) detecting a variation of a magnetic field caused by a rotation of the magnetic rotor, and iii) having a lead wire extending therefrom;
    an external lead cable that is drawn out from the inner space through the receiving hole in the core member,
    the external lead cable being electrically connected to the lead wire; and
    a sealing member that is secured to an outer peripheral surface of the external lead cable, the sealing member being fitted in the receiving hole of the core member.

2. The rotation detecting apparatus according to claim 1, wherein a sealing rubber is disposed on a coupling portion between the receiving hole in the core member and the sealing member to seal the coupling portion.

3. The rotation detecting apparatus according to claim 1, further comprising a latch projection that is integrated with the sealing member, the latch projection: i) being engaged with the core member from a side of the inner space, and ii) being larger than the receiving hole in the core member.

4. The rotation detecting apparatus according to claim 1, wherein the core member is formed into a cup-like configuration, and an opening space of the core member is secured to the outer member and the opening space is covered by the outer member so that the inner space is defined in an interior of the core member, an inner casing assembly is fixed on the core member, and the detecting section and the external lead cable are attached to an interior of the inner casing assembly.

5. The rotation detecting apparatus according to claim 4, further comprising:
    a pressing hardware that is fitted in the core member from an outside of the inner casing assembly so that the pressing hardware is pressed into the core member, and the inner casing assembly is secured to the core member by the pressing hardware.

* * * * *